United States Patent
Ukil et al.

(10) Patent No.: US 12,462,199 B2
(45) Date of Patent: Nov. 4, 2025

(54) ADAPTIVE FILTER BASED LEARNING MODEL FOR TIME SERIES SENSOR SIGNAL CLASSIFICATION ON EDGE DEVICES

(71) Applicant: Tata Consultancy Services Limited, Mumbai (IN)

(72) Inventors: Arijit Ukil, Kolkata (IN); Arpan Pal, Kolkata (IN); Soma Bandyopadhyay, Kolkata (IN); Ishan Sahu, Kolkata (IN); Trisrota Deb, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 1065 days.

(21) Appl. No.: 17/156,821

(22) Filed: Jan. 25, 2021

(65) Prior Publication Data

US 2021/0326765 A1 Oct. 21, 2021

(30) Foreign Application Priority Data

Apr. 17, 2020 (IN) .............................. 202021016639

(51) Int. Cl.
*G06N 20/20* (2019.01)
*G06F 17/16* (2006.01)
(Continued)

(52) U.S. Cl.
CPC ............. *G06N 20/20* (2019.01); *G06F 17/16* (2013.01); *G06F 18/24* (2023.01); *G06N 20/10* (2019.01)

(58) Field of Classification Search
CPC ........ G06N 20/20; G06N 20/10; G06F 18/24; G06F 17/16
See application file for complete search history.

(56) References Cited

U.S. PATENT DOCUMENTS 5,161,017 A * 11/1992 Sato ....................... H04N 5/211
  348/614
6,772,185 B1 * 8/2004 Masuda ................ G06F 17/148
  708/530

(Continued)

OTHER PUBLICATIONS

NPL: Barszcz, Tomasz. "Decomposition of vibration signals into deterministic and nondeterministic components and its capabilities of fault detection and identification." International Journal of Applied Mathematics and Computer Science 19.2 (2009): 327-335. (Year: 2009).*

(Continued)

*Primary Examiner* — Li B. Zhen
*Assistant Examiner* — Sadik A Alshahari
(74) *Attorney, Agent, or Firm* — Finnegan, Henderson, Farabow, Garrett & Dunner, LLP

(57) ABSTRACT

This disclosure relates generally to method and system for an adaptive filter based learning model for time series sensor signal classification on edge devices. The adaptive filter based learning model for time series sensor signal classification enables automated-computationally lightweight learning (significant reduction in computational resources) and inferring/classification in real-time or near-real-time on CPU/memory/battery life constrained edge devices. The disclosed techniques for time series sensor signal classification on edge devices characterizes the intrinsic signal processing properties of the input time series sensor signals using linear adaptive filtering and derivative spectrum to efficiently construct the adaptive filter based learning model based on standard classification algorithms for time series sensor signal classification.

7 Claims, 10 Drawing Sheets

(51) Int. Cl.
*G06F 18/24* (2023.01)
*G06N 20/10* (2019.01)

(56) References Cited

U.S. PATENT DOCUMENTS

| | | | | |
|---|---|---|---|---|
| 10,540,597 | B1* | 1/2020 | Tilton | G06N 20/00 |
| 2002/0023020 | A1* | 2/2002 | Kenyon | G10L 25/48 |
| | | | | 704/231 |
| 2008/0301071 | A1* | 12/2008 | Muggleton | G06F 18/22 |
| | | | | 703/12 |
| 2012/0284318 | A1* | 11/2012 | Naik | H03H 21/0012 |
| | | | | 708/300 |
| 2014/0025354 | A1* | 1/2014 | Padullaparthi | G06N 20/00 |
| | | | | 703/2 |
| 2014/0044273 | A1* | 2/2014 | Hashimoto | G10L 21/0232 |
| | | | | 381/66 |
| 2015/0092966 | A1* | 4/2015 | Andersen | H04R 25/00 |
| | | | | 381/316 |
| 2016/0148103 | A1* | 5/2016 | Sarrafzadeh | G06N 20/00 |
| | | | | 706/46 |
| 2017/0141836 | A1* | 5/2017 | Kim | H04B 7/15585 |
| 2018/0013409 | A1* | 1/2018 | Shibayama | G06F 17/14 |
| 2018/0060151 | A1* | 3/2018 | Gross | G06N 20/00 |
| 2018/0168515 | A1* | 6/2018 | Farahmand | G06N 20/00 |
| 2019/0050688 | A1* | 2/2019 | Iyer | G06N 3/08 |
| 2019/0113973 | A1* | 4/2019 | Coleman | G06N 3/126 |
| 2019/0246989 | A1* | 8/2019 | Genov | G06N 20/00 |
| 2019/0289038 | A1* | 9/2019 | Li | G06N 20/00 |
| 2020/0093423 | A1* | 3/2020 | Dafna | G06N 20/00 |
| 2020/0099707 | A1* | 3/2020 | Abbaszadeh | G06N 20/00 |
| 2020/0184351 | A1* | 6/2020 | Wang | G06N 20/00 |
| 2021/0012235 | A1* | 1/2021 | Abbas | G06N 20/00 |
| 2021/0210111 | A1* | 7/2021 | Li | H04R 3/005 |

OTHER PUBLICATIONS

NPL: Drugman, Thomas, and Thierry Dutoit. "The Deterministic plus Stochastic Model of the Residual Signal and its Applications." arXiv preprint arXiv:2001.01000 (2019). (Year: 2019).*

NPL: To, C. W. S. "On computational stochastic structural dynamics applying finite elements." Archives of Computational Methods in Engineering 8 (2001): 3-40. (Year: 2001).*

NPL: Xu, Wenjie, et al. "High accuracy classification of EEG signal." (2004). (Year: 2004).*

NPL: Duarte, Felipe SLG, et al. "Decomposing time series into deterministic and stochastic influences: A survey." Digital Signal Processing 95 (2019). (Year: 2019).*

NPL: Digital Signal Processing—Adaptive Digital filters Book Chapter 10. (Year: 2001).*

NPL: Rakesh, Pogula, and T. Kishore Kumar. "A novel RLS based adaptive filtering method for speech enhancement." (2015). (Year: 2015).*

NPL: Mugdha, et al., "A study of recursive least squares (RLS) adaptive filter algorithm in noise removal from ECG signals." (2015). (Year: 2015).*

NPL: Randall, Robert B., et al., "A comparison of methods for separation of deterministic and random signals." (2011). (Year: 2011).*

Author: Samaneh Kouchaki, Konstantinos Eftaxias, Saeid Sanei Title: An Adaptive Filtering Approach Using Supervised SSA for Identification of Sleep Stages From EEG Title of the item: Psychology Date: 2014 Publisher: Semantic Scholar Link: https://core.ac.uk/download/pdf/151169558.pdf.

Author: Xudong Chengy, Yejun Hey and Mohsen Guizaniz Title: OFDM De-Noising with RLS Adaptive Filter Title of the item: 19th International Symposium on Wireless Personal Multimedia Communications (WPMC) Date: 2016 Publisher: IEEE Link: https://ieeexplore.ieee.org/document/7954512/.

Author: Eleonora Sulas, Monica Urru, Roberto Tumbarello, Luigi Raffo and Danilo Pani Title: Systematic analysis of single and multi-reference adaptive filters for non-invasive fetal electrocardiogra Title of the item: Math Biosci Eng Date: 2019 vol. 17(1) pp. 286-308 Publisher: NCBI Link: https://pubmed.ncbi.nlm.nih.gov/31731352/.

Author: Amar Alauldeen Abdulmajeed, Alhamzah Taher Mohammed Title: Noise Cancellation in Communication Systems using LMS and RLS Algorithms Title of the item: International Journal of Simulation—Systems, Science & Technology Date: 2019 vol. 20(1) Publisher: IJSSST Link: https://ijssst.info/vol-20/No-1/paper4.pdf.

* cited by examiner

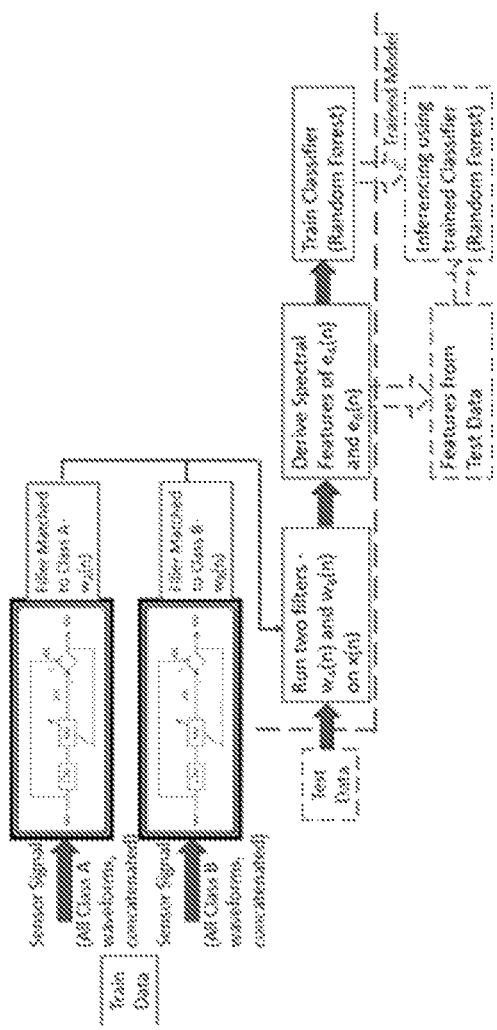

ADAPTIVE FILTER BASED LEARNING MODEL FOR TIME SERIES SENSOR SIGNAL CLASSIFICATION ON EDGE DEVICES

CROSS-REFERENCE TO RELATED APPLICATIONS AND PRIORITY

The present application claims priority from Indian provisional application no. 202021016639, filed on Apr. 17, 2020.

TECHNICAL FIELD

The disclosure herein generally relates to the field of time series sensor signal classification and, more particularly, to field of an adaptive filter based learning model for time series sensor signal classification on edge devices.

BACKGROUND

In today's digital era, an applications or edge devices that utilize Internet of Things (IoT) collect and/or generate enormous data from various sensory data over time for a wide range of fields and applications that include health, transportation, smart home, smart city, agriculture, education, etc. The IoT processes data based on the nature of the application where it is used, wherein the data streams may be big or fast/real-time data streams. The data streams thus collected by IoT are further used to discover new information, predict future insights, and make control decisions by applying analytics over such data streams. The analytics to be applied on the data streams collected by IoT is a crucial process that makes IoT a worthy paradigm for businesses and a quality-of-life improving technology.

The existing techniques for analyzing the IoT data stream are based on intelligent learning mechanism. Most of the machine learning approaches that include Deep Learning (DL), Machine Learning (ML), reinforcement learning has been actively utilized in many IoT applications in recent years. Traditional ML and DL systems are usually computationally heavy for training or learning part especially for IoT based sensor systems. It is implemented on resource constrained edge devices like wearable and implantable devices for predictive healthcare, low-cost edge processors for machine diagnostics.

Hence construction of learning model under computational and energy constraints, particularly in highly limited training time requirement is a critical requirement of today's digital era as unique necessities of many practical IoT applications using time series sensor signal analytics for edge devices are still largely unrealized.

SUMMARY

Embodiments of the disclosure present technological improvements as solutions to one or more of the above-mentioned technical problems recognized by the inventors in conventional systems. For example, in one embodiment, an adaptive filter based learning model for time series sensor signal classification on edge devices is provided. The adaptive filter based learning model for time series sensor signal classification enables automated-computationally lightweight learning (significant reduction in computational resources) and inferring/classification in real-time or near-real-time on CPU/memory/battery life constrained edge devices. The disclosed techniques for time series sensor signal classification on edge devices characterizes the intrinsic signal processing properties of the input time series sensor signals using linear adaptive filtering and derivative spectrum to efficiently construct the adaptive filter based learning model based on standard classification algorithms for time series sensor signal classification.

In another aspect, a method for an adaptive filter based learning model for time series sensor signal classification on edge devices is provided. The method includes receiving a plurality of training data that comprises of univariate time series data from a plurality of edge devices, wherein the plurality of time series input data includes atleast one of time series signals or time series classes. The method further includes constructing a plurality of prediction filters based on an adaptive filtering techniques using the training data and a time delayed version of the training data to predict an optimal filter co-efficient, wherein a time series signal prediction filter is constructed for each instance of the time series signals or a time series class prediction filter is constructed for each of the time series classes. The method further includes constructing a linear filter using the predicted optimal filter co-efficient filter to obtain a deterministic component and a stochastic component for each of the training data. The method further includes deriving a derivative spectrum from the deterministic component and the stochastic component based on fast fourier transform techniques to obtain a complete feature set of the training data. The method further includes selecting a subset of features from the complete feature set of the training data based on a set of pre-defined cut off frequencies. The method further includes generating a training data feature vector from the selected sub-set of features from training data. The method further includes generating a time series sensor signal classification learning model using the training data feature vector based on classification techniques for classification of time series signal on edge devices, wherein the step of classification of time series signal on edge devices further includes receiving a plurality of testing data that comprises of univariate time series data from a plurality of edge devices, constructing a plurality of prediction filters based on adaptive filtering techniques using the training data and a time delayed version of the testing data to predict an optimal filter co-efficient, constructing a linear filter using the predicted optimal filter co-efficient to obtain a deterministic component and a stochastic component for each of the testing data, deriving a derivative spectrum from the deterministic component and the stochastic component based on fast fourier transform techniques to obtain a complete feature set of the testing data, selecting a subset of features from the complete feature set of the testing data based on a set of pre-defined cut off frequencies, generating a testing feature vector from the selected sub-set of features of the testing data and finally classifying the testing data based on comparison between the testing feature vector and the time series sensor signal classification learning model.

In another aspect, a system for an adaptive filter based learning model for time series sensor signal classification on edge devices is provided. The system comprises of an adaptive filter based learning model for time series sensor signal classification on edge devices, a memory for storing instructions; one or more communication interfaces, one or more hardware processors communicatively coupled to the memory using the one or more communication interfaces, wherein the one or more hardware processors are configured by the instructions to execute the one or more modules of the adaptive filter based learning model (102) for time series sensor signal classification on edge devices. The system further comprises a input module configured for receiving input that further includes a training data input module for receiving a plurality of training data from a plurality of edge devices and a test data input module for receiving a plurality of testing data from a plurality of edge devices, wherein the training and the testing data includes atleast one of time series signals or time series classes. The system further comprises a prediction filter module that further includes a training data prediction filter module configured for constructing a plurality of prediction filters based on an adaptive filtering technique using the training data and a time delayed version of the training data and a testing data prediction filter module configured for constructing a plurality of prediction filters based on adaptive filtering techniques using the testing data and a time delayed version of the testing data to predict an optimal filter co-efficient. The system further comprises a linear filter module configured for constructing a linear filter further includes a training data linear filter module for constructing a linear filter using the predicted optimal filter co-efficient filter for each of the training data and a testing data linear filter module for constructing a linear filter using the predicted optimal filter co-efficient filter for each of the testing data. The system further comprises a derivative spectrum module configured for deriving a derivative spectrum from the deterministic component and the stochastic component based on fast fourier transform techniques to obtain a complete feature set of the training data and the testing data. The system further comprises a feature selection module configured for selecting a subset of features from the complete feature set of the training data and the complete feature set of the testing data based on a set of pre-defined cut off frequencies. The system further comprises a feature vector module further includes a training data feature vector module configured for generating a training feature vector from the selected sub-set of features of the training data and a testing data feature vector module configured for generating a testing feature vector from the selected sub-set of features of the testing data. The system further comprises a classifier that further includes a training classifier configured for generating time series sensor signal classification learning model using the training data feature vector based on classification techniques. The system further comprises an inference classifier configured for classifying the testing data using the time series sensor signal classification learning model based on comparison between the testing feature vector and the time series sensor signal classification learning model.

Another embodiment provides a non-transitory computer-readable medium having embodied thereon a computer program for a computer readable program, wherein the computer readable program, when executed by one or more hardware processors, causes an adaptive filter based learning model for time series sensor signal classification on edge devices is provided. The program includes receiving a plurality of training data that comprises of univariate time series data from a plurality of edge devices, wherein the plurality of time series input data includes atleast one of time series signals or time series classes. The program further includes constructing a plurality of prediction filters based on an adaptive filtering techniques using the training data and a time delayed version of the training data to predict an optimal filter co-efficient, wherein a time series signal prediction filter is constructed for each instance of the time series signals or a time series class prediction filter is constructed for each of the time series classes. The program further includes constructing a linear filter using the predicted optimal filter co-efficient filter to obtain a deterministic component and a stochastic component for each of the training data. The program further includes deriving a derivative spectrum from the deterministic component and the stochastic component based on fast fourier transform techniques to obtain a complete feature set of the training data. The program further includes selecting a subset of features from the complete feature set of the training data based on a set of pre-defined cut off frequencies. The program further includes generating a training data feature vector from the selected sub-set of features from training data. The program further includes generating a time series sensor signal classification learning model using the training data feature vector based on classification techniques for classification of time series signal on edge devices, wherein the step of classification of time series signal on edge devices further includes receiving a plurality of testing data that comprises of univariate time series data from a plurality of edge devices, constructing a plurality of prediction filters based on adaptive filtering techniques using the training data and a time delayed version of the testing data to predict an optimal filter co-efficient, constructing a linear filter using the predicted optimal filter co-efficient to obtain a deterministic component and a stochastic component for each of the testing data, deriving a derivative spectrum from the deterministic component and the stochastic component based on fast fourier transform techniques to obtain a complete feature set of the testing data, selecting a subset of features from the complete feature set of the testing data based on a set of pre-defined cut off frequencies, generating a testing feature vector from the selected sub-set of features of the testing data and finally classifying the testing data based on comparison between the testing feature vector and the time series sensor signal classification learning model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5A and FIG. 5B illustrates prediction filters constructed for each instance of the time series input data that includes a prediction filter for each instance of time series signal data and a prediction filter for each instance of time series class data, implemented by the system of FIG. 1 according to some embodiments of the present disclosure.

DETAILED DESCRIPTION OF EMBODIMENTS

Figure 1:
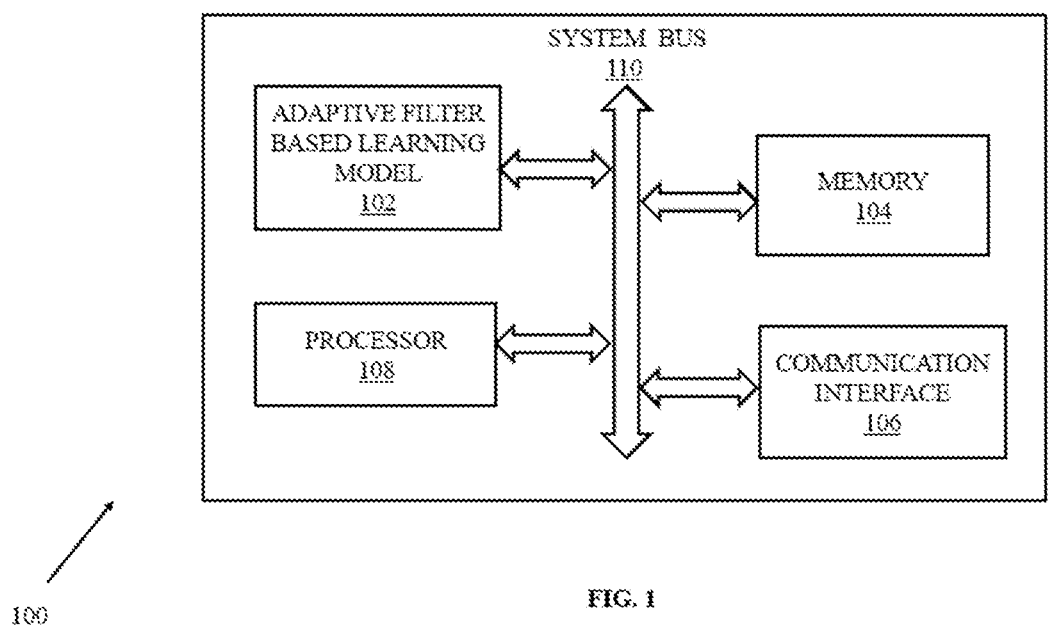
FIG. 1 illustrates an exemplary block diagram of a system for an adaptive filter based learning model for time series sensor signal classification on edge devices in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The disclosure provides an adaptive filter based learning model for time series sensor signal classification on edge devices. The adaptive filter based learning model for time series sensor signal classification enables automated-computationally lightweight learning (significant reduction in computational resources) and inferring/classification in real-time or near-real-time on CPU/memory/battery life constrained edge devices. The disclosed techniques for time series sensor signal classification on edge devices characterizes the intrinsic signal processing properties of the input time series sensor signals using linear adaptive filtering and derivative spectrum to efficiently construct the adaptive filter based learning model based on standard classification algorithms for time series sensor signal classification.

The objective of the adaptive filter based learning model is trading off a training time and an inference time with performance accuracy for significantly greater gain in training time. In an illustration, a representative landscape graph of the adaptive filter based learning model in FIG. 3, wherein the unique position of the adaptive filter based learning model is displayed, with the training time and the inference time as plotted on X-axis and Y-axis respectively. The graph illustrated gives the unique position of the proposed method (adaptive filter based learning model) with respect to other existing techniques that include machine learning (ML), deep learning (DL) and hybrid learning with signal processing.

Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

FIG. 1 is a block diagram of a system (100) for the adaptive filter based learning model for time series sensor signal classification on edge devices, in accordance with an example embodiment. The system (100) includes an adaptive filter based learning model (102) for time series sensor signal classification on edge devices. The adaptive filter based learning model (102) includes or is otherwise in communication with a memory (104), a communication interface (106), and a processor (108). The memory (104), communication interface (106), and the processor (108) may be coupled by a system bus (110) or a similar mechanism. Although FIG. 1 shows example components of adaptive filter based learning model (102), in other implementations, the system (100) may contain fewer components, additional components, different components, or differently arranged components than depicted in FIG. 1.

The processor (108) may be implemented as one or more microprocessors, microcomputers, microcontrollers, digital signal processors, central processing units, state machines, logic circuitries, and/or any devices that facilitates in designing polymeric carrier for controlled release of molecules. Further, the processor (108) may comprise a multi-core architecture. Among other capabilities, the processor (108) is configured to fetch and execute computer-readable instructions or modules stored in the memory (104). The processor (108) may include circuitry implementing, among others, audio and logic functions associated with the communication. For example, the processor (108) may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor (108) thus may also include the functionality to encode messages and/or data or information. The processor (108) may include, among other things, a clock, an arithmetic logic unit (ALU) and logic gates configured to support operation of the processor (108). Further, the processor (108) may include functionality to execute one or more software programs, which may be stored in the memory (104) or otherwise accessible to the processor (108).

The memory (104), may store any number of pieces of information, and data, used by the system (100) to implement the functions of the system (100). The memory (104) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include but are not limited to volatile random access memory (RAM). The non-volatile memory may additionally or alternatively comprise an electrically erasable programmable read only memory (EEPROM), flash memory, hard drive, or the like. The memory 104 may be configured to store information, data, applications, instructions or the like for enabling the system (100) to carry out various functions in accordance with various example embodiments. Additionally or alternatively, the memory (104) may be configured to store instructions which when executed by the processor (108) causes the system (100) to behave in a manner as described in various embodiments.

The communication interface(s) (106) can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) (106) may include one or more ports. One or more functionalities of the system (100) and components thereof, is further explained in detail with respect to block diagram described in FIG. 2.

Figure 7A:
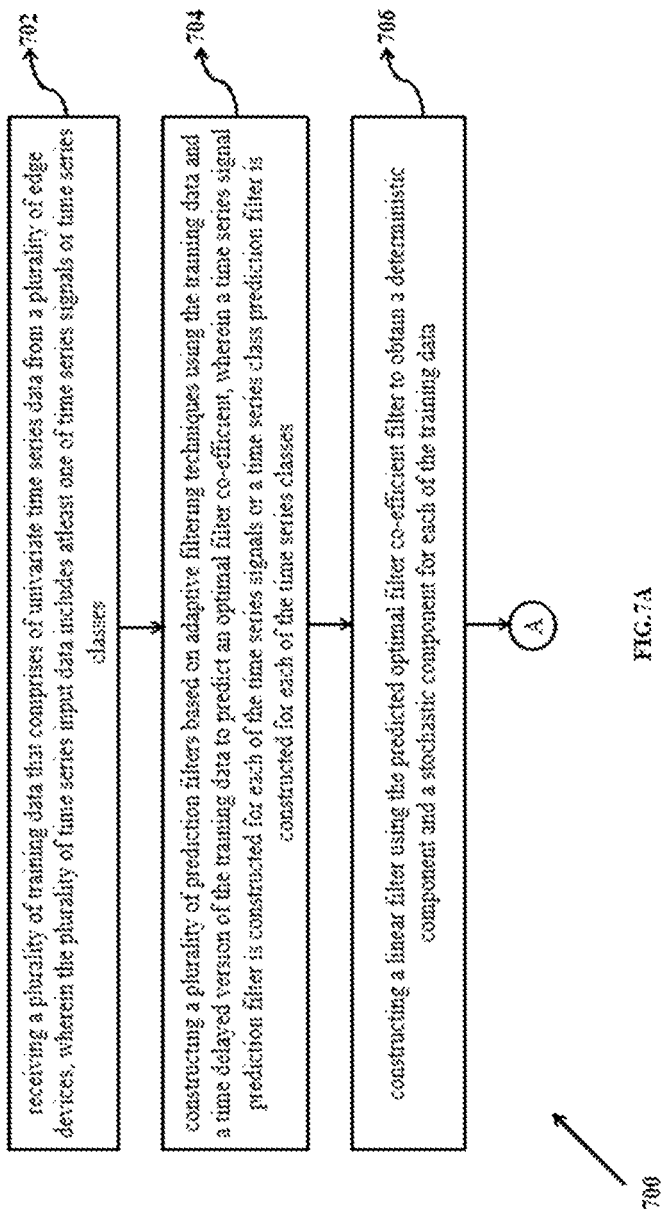
FIG. 7A and FIG. 7B is an exemplary flow diagram an adaptive filter based learning model for time series sensor signal classification on edge devices by the system of FIG. 1, according to some embodiments of the present disclosure.
Figure 7B:
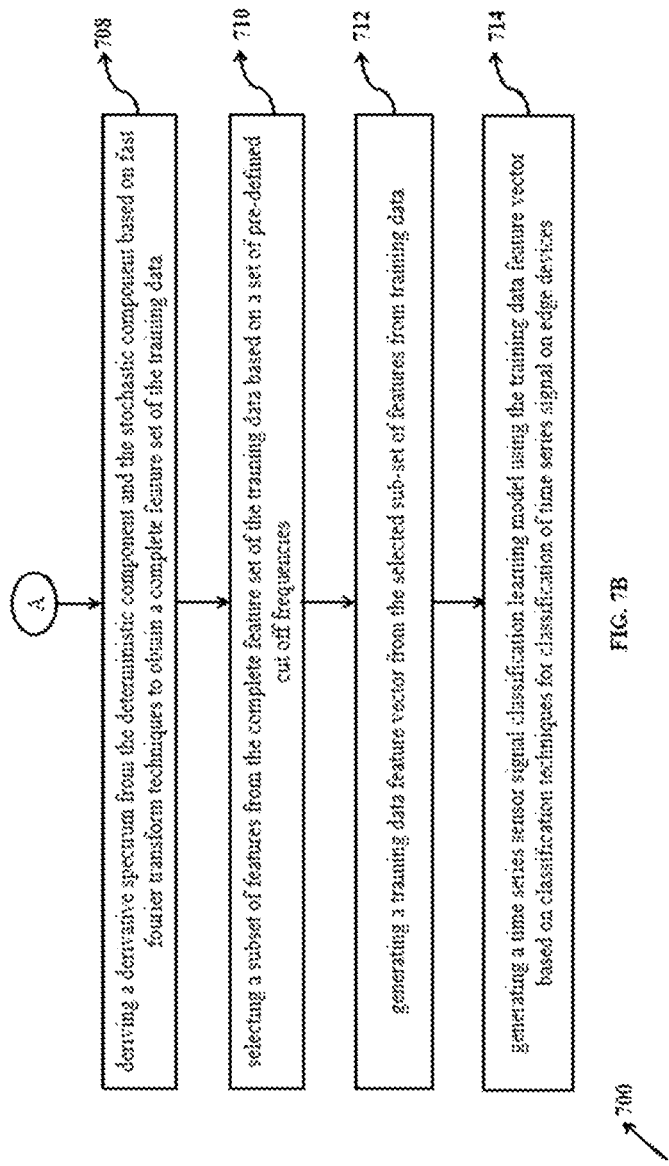

Functions of the components of the system (100) are explained in conjunction with functional modules of the system (100) stored in the memory (104) and further explained in conjunction with flow diagram of FIGS. 7A and 7B.

Figure 2:
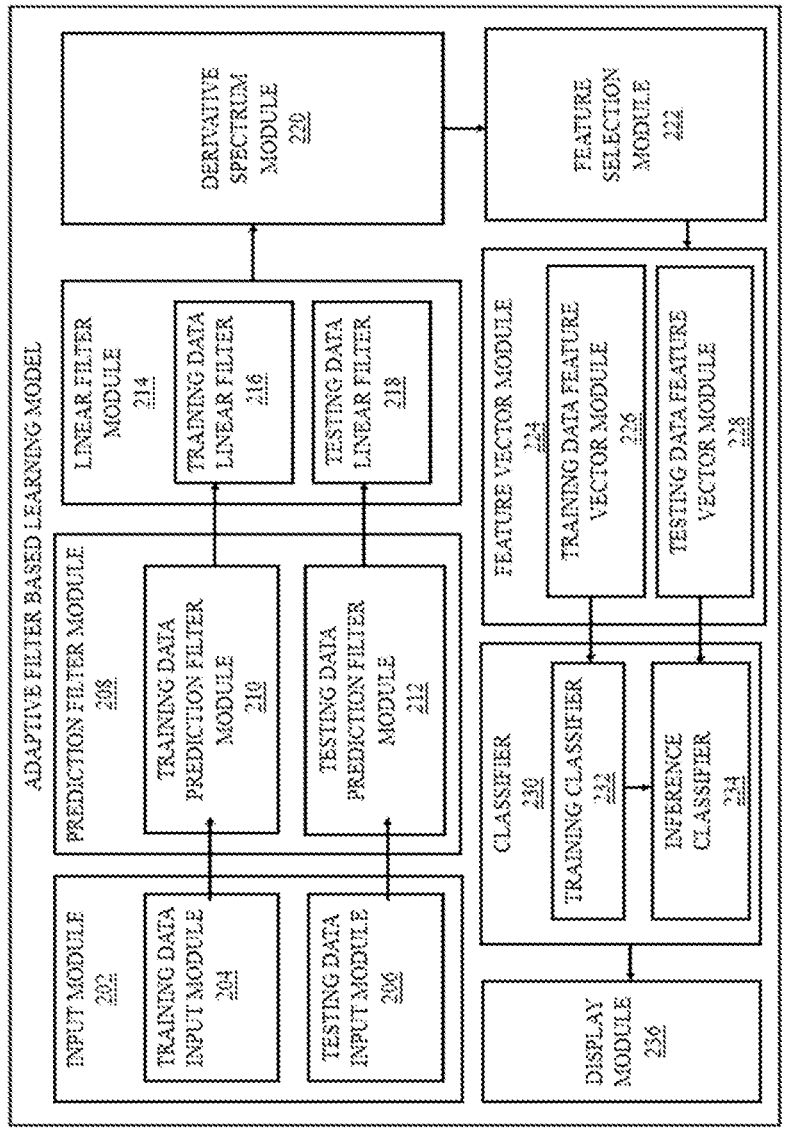
FIG. 2 is a functional block diagram of various modules stored in module(s) of a memory of the system of FIG. 1 in accordance with some embodiments of the present disclosure.

FIG. 2, with reference to FIG. 1, is a block diagram of various modules of an adaptive filter based learning model (102) for time series sensor signal classification on edge devices (102) of the system 100 of FIG. 1 in accordance with an embodiment of the present disclosure.

In an embodiment of the present disclosure, the FIG. 2 illustrates the functions of the components of the adaptive filter based learning model (102) of the system (100). The system for an adaptive filter based learning model for time series sensor signal classification on edge devices comprises a input module (202) that is configured for receiving input that further includes a training data input module (204) for receiving a plurality of training data and a test data input module (206) for receiving a plurality of testing data from a plurality of edge devices, wherein the training and the testing data includes atleast one of time series signals or time series classes. The system for an adaptive filter based learning model for time series sensor signal classification on edge devices further comprises a prediction filter module (208) that further includes a training data prediction filter module (210) configured for constructing a plurality of prediction filters based on adaptive filtering techniques using the training data and a time delayed version of the training data and a testing data prediction filter module (212) configured for constructing a plurality of prediction filters based on adaptive filtering techniques using the testing data and a time delayed version of the testing data to predict an optimal filter co-efficient. The system for an adaptive filter based learning model for time series sensor signal classification on edge devices comprises a linear filter module (214) configured for constructing a linear filter that further includes a training data linear filter module (216) for constructing a linear filter using the predicted optimal filter co-efficient filter for each of the training data and a testing data linear filter module (218) for constructing a linear filter using the predicted optimal filter co-efficient filter for each of the testing data. The system for an adaptive filter based learning model for time series sensor signal classification on edge devices further comprises a derivative spectrum module (220) configured for deriving a derivative spectrum from the deterministic component and the stochastic component based on fast fourier transform techniques to obtain a complete feature set of the training data and the testing data. The system for an adaptive filter based learning model for time series sensor signal classification on edge devices comprises a feature selection module (222) configured for selecting a subset of features from the complete feature set of the training data and the complete feature set of the testing data based on a set of pre-defined cut off frequencies. The system for an adaptive filter based learning model for time series sensor signal classification on edge devices comprises a feature vector module (224) that further includes a training data feature vector module (226) configured for generating a training feature vector from the selected sub-set of features of the training data and a testing data feature vector module (228) configured for generating a testing feature vector from the selected sub-set of features of the testing data. The system for an adaptive filter based learning model for time series sensor signal classification on edge devices comprises a classifier (230) further including a training classifier (232) configured for generating time series sensor signal classification learning model using the training data feature vector based on classification techniques and an inference classifier (234) configured for classifying the testing data using the time series sensor signal classification learning model based on comparison between the testing feature vector and the time series sensor signal classification learning model. The system for an adaptive filter based learning model for time series sensor signal classification on edge devices comprises a display module (236) for displaying the time series sensor signal classification on edge devices, as received from the inference classifier (234).

The various modules of the system for a system for an adaptive filter based learning model for time series sensor signal classification on edge devices are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system for an adaptive filter based learning model for time series sensor signal classification on edge devices comprises the input module (202) that is configured for receiving input that further includes a training data input module (204) and a test data input module (206), wherein the training and the testing data includes at least one of time series signals or time series classes.

In an embodiment the edge devices comprise of Internet of things (IoT) applications that include wearable and implantable for predictive healthcare, low-cost edge processors for machine diagnostics, etc., The training data input module (204) is configured for receiving a plurality of training data from a plurality of edge devices and the test data input module (206) is configured for receiving a plurality of testing data from a plurality of edge devices.

Figure 4:
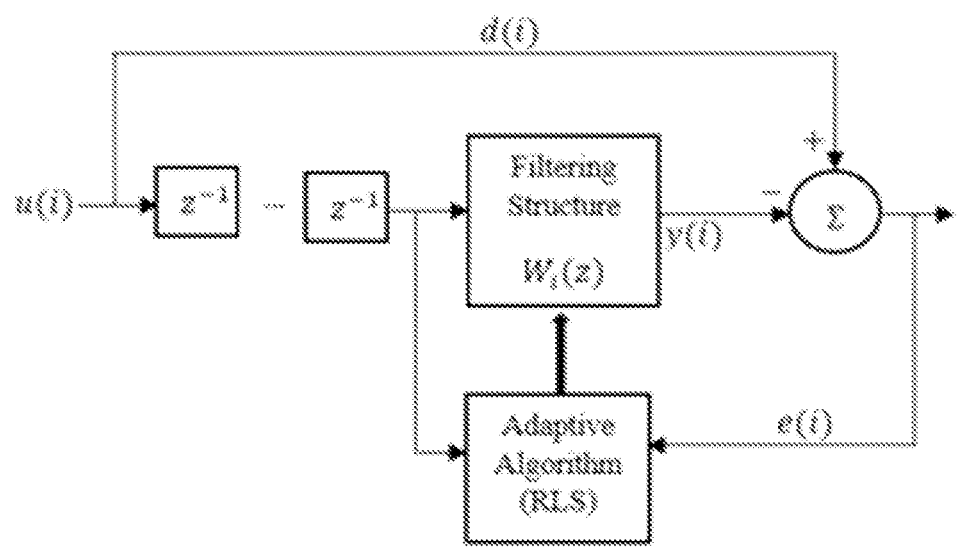
FIG. 4 illustrates an architecture of the adaptive filter based on Finite Impulse Response Recursive Least Squares (FIR-RLS) adaptive filtering techniques by the system of FIG. 1, according to some embodiments of the present disclosure.

According to an embodiment of the disclosure, the system for an adaptive filter based learning model for time series sensor signal classification on edge devices comprises the prediction filter module (208) that further includes a training data prediction filter module (210) and a testing data prediction filter module (212). The prediction filter is constructed for each instance of the time series input data based on the adaptive filtering techniques that includes Finite Impulse Response Recursive Least Squares (FIR-RLS), wherein the plurality of time series input data includes atleast one of time series signals or time series classes In an embodiment, the adaptive filtering techniques includes Finite Impulse Response Recursive Least Squares (FIR-RLS). The FIG. 4 illustrates the architecture of the adaptive filter, wherein Finite Impulse Response Recursive Least Squares (FIR-RLS) filters are considered. The constructed adaptive filter implements the task of a prediction filter, wherein the prediction filter acts as a learner of the structure of the input data u(i) to predict optimal filter co-efficient filter for each of the input data, which includes both the training data and the testing data.

Figure 5A:
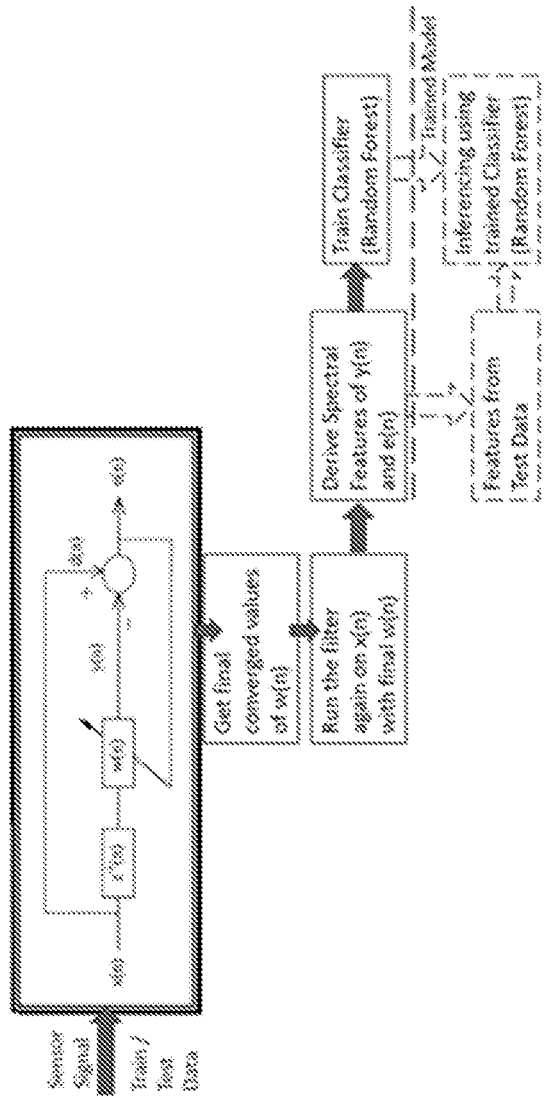

The training data prediction filter module (210) is configured for constructing a plurality of prediction filters based on an adaptive filtering technique using the training data and a time delayed version of the training data, wherein the plurality of time series input data includes atleast one of time series signals or time series classes. The adaptive filter is constructed from the training data and its time delayed version to predict an optimal filter co-efficient. Further the optimal filter co-efficient from the adaptive filter are used to construct the prediction filter. A prediction filter is constructed for each instance of the training data, wherein a time series signal prediction filter is constructed for each instance of the time series signals or a time series class prediction filter is constructed for each of the time series classes. In an embodiment, for "n" time series signals, "n" number of time series signal prediction filter are constructed and for "C" number of time series class, C-number of time series class prediction filter are constructed as illustrated in FIG. 5A and FIG. 5B.

Further the testing data prediction filter module (212) is configured for constructing a plurality of prediction filters based on adaptive filtering techniques using the testing data and a time delayed version of the testing data to predict an optimal filter co-efficient. A prediction filter is constructed for each instance of the testing data, wherein a time series signal prediction filter is constructed for each instance of the time series signals or a time series class prediction filter is constructed for each of the time series classes. In an embodiment, for "n" number of time series signals, "n" number of time series signal prediction filter are constructed and for "C" number of time series class, C-number of time series class prediction filter are constructed as illustrated in FIG. 5A and FIG. 5B.

Figure 3:
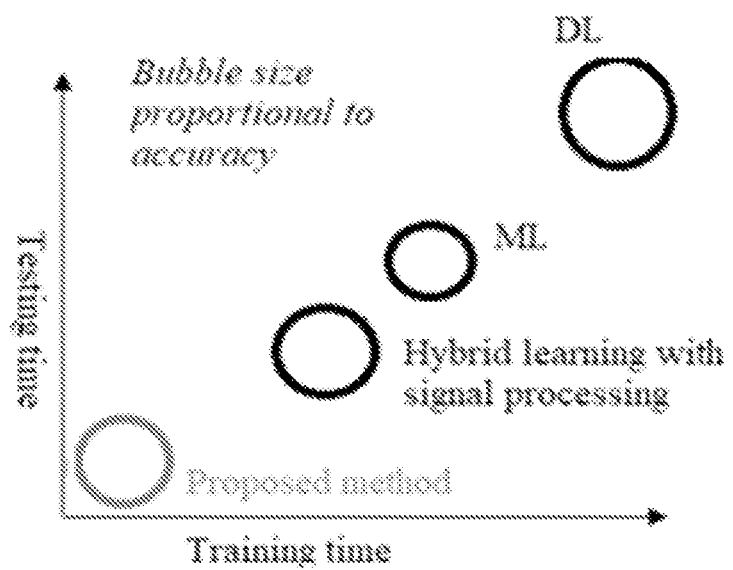
FIG. 3 is a graph illustrating a representative landscape graph of the adaptive filter based learning model, wherein the unique position of the adaptive filter based learning model is displayed.

In an embodiment, the construction of a plurality of prediction filters based on adaptive filtering techniques is explained in this section. In an example scenario, the input is represented as u(i) its is a time series $[u_1, u_2, u_3, \ldots, u_T] \in \mathbb{R}^T$ is an ordered set of real values. Further the desired response: d(i) is a time-advanced version of u(i), advanced by δ samples, such that: d(i)=u(i+δ) with i≥0. Further if $\mathbb{U}$ be the training dataset, consists of $\{u^1(i), l^1\}$, $\{u^2(i), l^2\}, \ldots, \{u^N(i), l^N\}$, where N is the number of training instances and $l^n$ is corresponding class labels. Currently, the binary classification, $l^n \in \pm 1$. The Optimal filter coefficients, $\omega_n(k)$, for k=0, 1, 2, …, p of $p^{th}$ order FIR filter are derived by the adaptive filter constructed based on FIR-RLS filter techniques. For each of u(i), an adaptation to create prediction filters as shown in FIG. 3 is constructed for each instance of time series input signal, which results in deriving the optimal filter coefficients ($W^n$) for each of the training instances. Thus, $W^n$, n=1, 2, … N optimal filter coefficient sets are generated, N=number of input instances, where $W^n \in \mathbb{R}^p$, p is the filter order. From $u^1(i)$, we get $W^1$ optimal filter coefficients. Subsequently, from $u^2(i), \ldots, u^N(i), W^2, \ldots, W^N$ are computed and the complete coefficient matrix is: $W \in \mathbb{R}^{N \times p}$.

According to an embodiment of the disclosure, the system for an adaptive filter based learning model for time series sensor signal classification on edge devices comprises the linear filter module (214) configured for constructing a linear filter that further includes the training data linear filter module (216) and the testing data linear filter module (218). In an embodiment, the time series input data in the linear filters (u(i)) is decomposed into deterministic component ($u_d(i)$) and the stochastic component ($u_s(i)$), whose transforms can be represented as û and ε.

The training data linear filter module (216) is configured for constructing a linear filter using the predicted optimal filter co-efficient filter for each of the training data. Further the testing data linear filter module (218) for constructing a linear filter using the predicted optimal filter co-efficient filter for each of the testing data.

In an embodiment, the construction of linear filter using the predicted optimal filter co-efficient filter is explained in the section. Each of the u(i) is filtered by respective prediction filters constructed using the corresponding prediction filter coefficients as:

$$u(i) \xrightarrow{W_i(z)} \hat{u}(i).$$

Further û and ε that are the transformation from each of the input data by the prediction filter is used for determining ε(i)=u(i)−û(i). Hence, is capable to provide satisfactory modeling of the input data. Further u(i) can decompose into two components as: $u(i)=u_d(i)+u_s(i)$, where, $u_d(i)$ denotes the deterministic or regular part of u(i), and $u_s(i)$ is the stochastic or random part of u(i), wherein û(i) represents the deterministic component ($u_d(i)$) and ε(i) is the stochastic component ($u_s(i)$). This is expected that the decomposition of input signal u(i) into orthogonal signals û and ε possesses significant potential to reveal interesting-distinct features and the decomposed components ensure availability of better and distinct feature set.

According to an embodiment of the disclosure, the system for an adaptive filter based learning model for time series sensor signal classification on edge devices comprises the derivative spectrum module (220) configured for deriving a derivative spectrum from the deterministic component and the stochastic component. The derivative spectrum is derived based on fast fourier transform techniques to obtain a complete feature set of the training data and the testing data.

In an embodiment, the derivative spectrum of the û and the ε that is derived is represented as $\mathcal{U}$ and $\mathbb{E}$, where a set of Fast Fourier Transform (FFT) co-efficients are computed based on deterministic component ($u_d(i)$) and the stochastic component ($u_s(i)$).

In an embodiment, deriving the derivative spectrum from the deterministic component and the stochastic component explained in the section. In order to create a limited yet generic representative features of the of û and ε, a used spectrum characterization technique called derivative spectrum—the differentiation of spectral coefficients is used to derive the derivative spectrum for better spectral discrimination to accentuate small structural differences between nearly identical spectra and enhances spectral resolution. Spectral derivatives of {û, ε} are computed and derivative spectrum {$\hat{\mathcal{U}}$, $\mathbb{E}$} is derived and expressed as shown below:

$$\{\hat{u}, \varepsilon\} \xrightarrow{\text{Derivative spectrum}} \{\hat{\mathcal{U}}, \mathbb{E}\}$$

According to an embodiment of the disclosure, the system for an adaptive filter based learning model for time series sensor signal classification on edge devices comprises the feature selection module (222) configured for selecting a subset of features from the complete feature set of the training data and the complete feature set of the testing data. The complete feature set of the training data and the complete feature set is selected based on a set of pre-defined cut off frequencies.

In an embodiment, the pre-defined cut off frequencies represented by a lower cut off frequency ($\Omega_l$) and a higher cut off frequency ($\Omega_h$) are determined using human-driven meta-information infusion.

In an embodiment, selecting a subset of features from the complete feature set of the training data and the complete feature set of the testing data is explained in this section. In order to understand the distinct characteristics of typical sensor signals, nominal domain knowledge like the spectral band of interest ($\Omega_l$, $\Omega_u$) or cut-off frequencies provides the necessary impetus to the learning process through human-driven meta-information infusion. The limit the $\hat{u}$, $\mathbb{E}$ according to the domain specified expert knowledge or meta-information and $\mathcal{F}_{\hat{u}} \in \mathbb{R}^q$, $\mathcal{F}_\mathbb{E} \in \mathbb{E}^q$ are derived. Subsequently, the complete feature vector $\mathcal{F} = \{\mathcal{F}_{\hat{u}}, \mathcal{F}_\mathbb{E}\}$, is generated where q is the number of FFT coefficients in $\hat{u}$ or $\mathbb{E}$.

Complete feature vector is $$\mathcal{F} \in \mathbb{R}^{2q}: \{\hat{u}, \varepsilon\} \xrightarrow[\text{driven cut-off }(\Omega_l, \Omega_u)]{\text{Band limited by expert}} \{\mathcal{F}_{\hat{u}}, \mathcal{F}_\mathbb{E}\}.$$

According to an embodiment of the disclosure, the system for an adaptive filter based learning model for time series sensor signal classification on edge devices comprises the feature vector module (224) and the testing data feature vector module (228). The training data feature vector module (226) configured for generating a training feature vector from the selected sub-set of features of the training data. Further the testing data feature vector module (228) configured for generating a testing feature vector from the selected sub-set of features of the testing data.

In an embodiment, the feature vector is generated by derivative spectrum from each of the deterministic component and the stochastic component is determined using the pre-defined cut off frequencies is represented as F=$F_{\hat{U}}$, $F_\mathbb{E}$, wherein the feature vector from the selected sub-set of features of the training data is represented as $F_{train}$ & the feature vector from the selected sub-set of features of the testing data is represented as $F_{test}$.

In a method similar to the training phase (as explained in the above sections), for the training method, each of the test input signals are transformed to $\hat{u}_{test}$, $\varepsilon_{test}$. Further the test feature vector $\mathcal{F}_{test}$ is generated as where input consists of $\hat{u}_{test}$, $\mathbb{E}_{test}$. The generated test features $\mathcal{F}_{test}$ are fed to the constructed adaptive filter based learning model to infer the class of the test instances.

According to an embodiment of the disclosure, the system for an adaptive filter based learning model for time series sensor signal classification on edge devices comprises the classifier (230) that further includes the training classifier (232) and the inference classifier (234).

In an embodiment, the classification techniques used in the learning model include Support Vector Machine (SVM) with radial basis function.

The training classifier (232) is configured for generating time series sensor signal classification learning model using the training data feature vector based on classification techniques. Further the inference classifier (234) configured for classifying the testing data using the time series sensor signal classification learning model based on comparison between the testing feature vector and the time series sensor signal classification learning model.

Figure 6A:
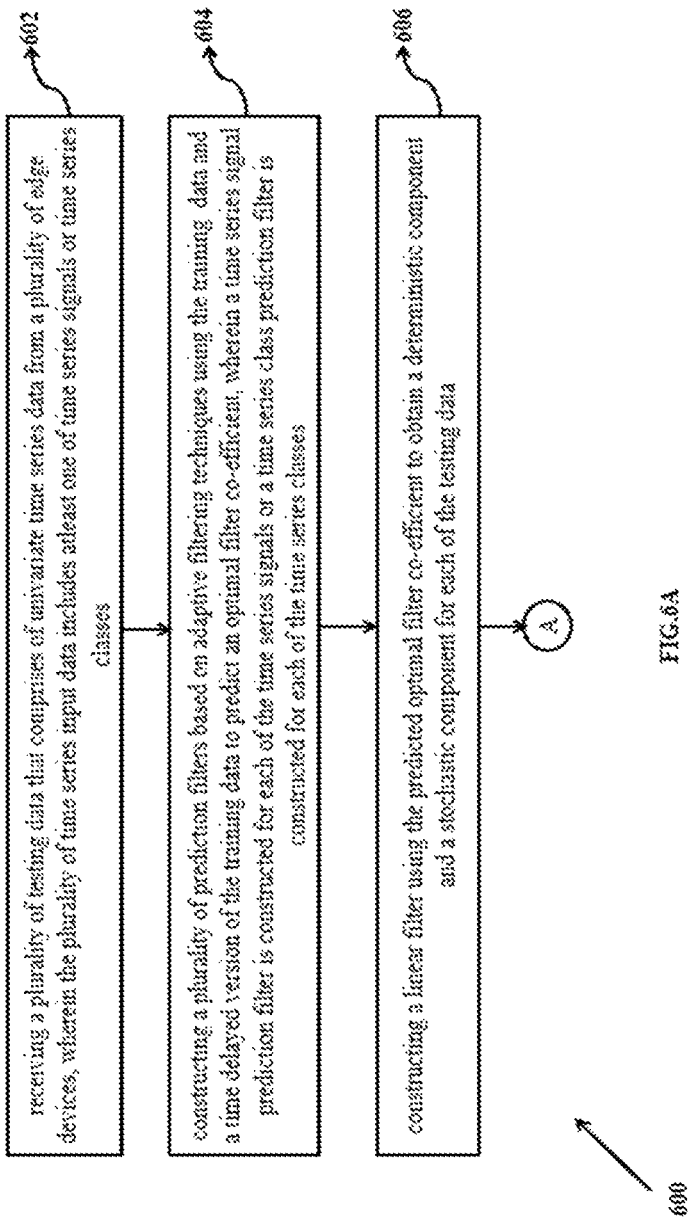
FIG. 6A and FIG. 6B is an exemplary flow diagram for classification of time series signal on edge devices implemented by the system of FIG. 1, according to some embodiments of the present disclosure.
Figure 6B:
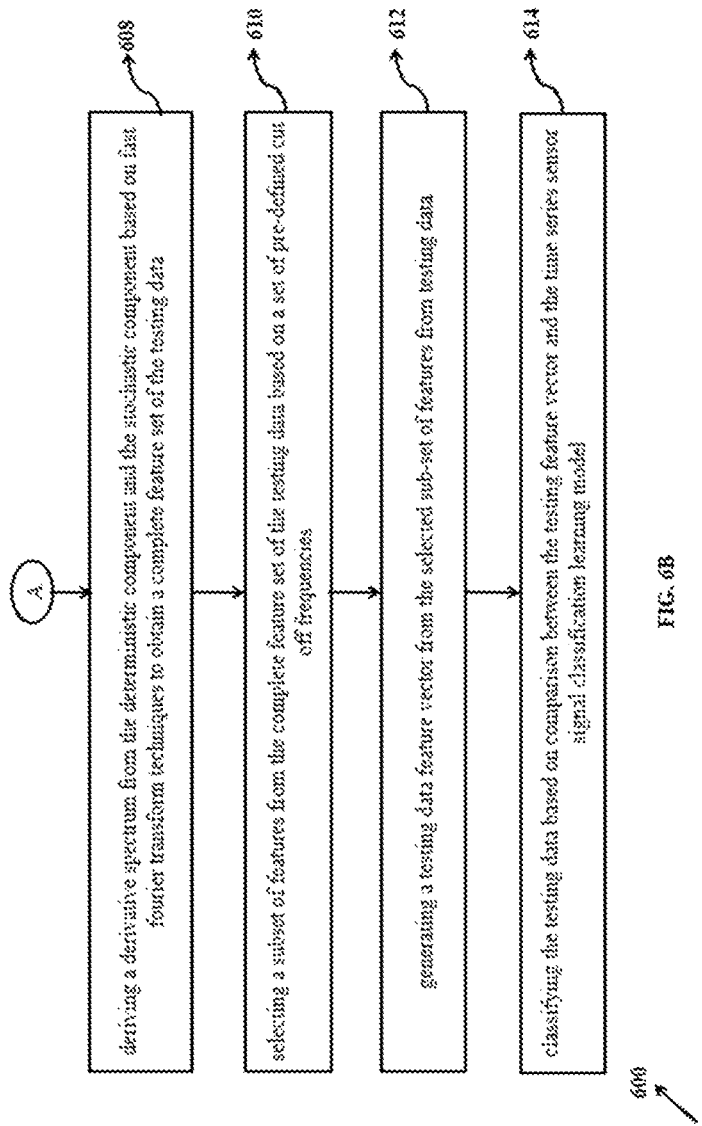

In one embodiment, FIG. 6A and FIG. 6B is an exemplary flow diagram for of classification of time series signal on edge devices implemented by the system of FIG. 1 and includes the following steps;

At step 602, the method (600) includes receiving a plurality of testing data that comprises of univariate time series data from a plurality of edge devices in the testing data input module (206) of the input module (202). The plurality of time series input data includes atleast one of time series signals or time series classes.

In the next step at 604, the method (600) includes constructing a plurality of prediction filters in the testing data prediction filter module (212) in the prediction filter module (208). The prediction filter is constructed based on adaptive filtering techniques that includes Finite Impulse Response Recursive Least Squares (FIR-RLS). The construction of the plurality of prediction filters is based on adaptive filtering techniques using the testing data and a time delayed version of the testing data to predict an optimal filter co-efficient, wherein a time series signal prediction filter is constructed for each of the time series signals or a time series class prediction filter is constructed for each of the time series classes.

In the next step at 606, the method (600) includes constructing a linear filter using the predicted optimal filter co-efficient in the testing data linear filter module (218) in the linear filter module (214). The linear filter is used to obtain a deterministic component and a stochastic component for each of the testing data. In an embodiment, the time series input data in the linear filters (u (i)) is decomposed into deterministic component ($u_d(i)$) and the stochastic component ($u_s(i)$), whose transforms can be represented as û and ε.

In the next step at 608, the method (600) includes deriving a derivative spectrum from the deterministic component and the stochastic component in the derivative spectrum module (220). The derivative spectrum is derived based on fast fourier transform techniques to obtain a complete feature set of the testing data. In an embodiment, the derivative spectrum of the û and the ε that is derived is represented as $\hat{U}$ and $\mathbb{E}$, where a set of Fast Fourier Transform (FFT) co-efficients are computed based on deterministic component ($u_d(i)$) and the stochastic component ($u_s(i)$).

In the next step at 610, the method (600) includes selecting a subset of features from the complete feature set of the testing data in the feature selection module (222). The subset of features is selected based on a set of pre-defined cut off frequencies. In an embodiment, the pre-defined cut off frequencies represented by a lower cut off frequency ($\Omega_l$) and a higher cut off frequency ($\Omega_h$) are determined using human-driven meta-information infusion.

In the next step at 612, the method (600) includes generating a testing feature vector from the selected sub-set of features of the testing data in the feature vector module (224). In an embodiment, the test feature vector is generated by derivative spectrum from each of the deterministic component and the stochastic component is determined using the pre-defined cut off frequencies is represented as F=$F_{\hat{U}}$, $F_\mathbb{E}$ In the next step at 614, the method (600) includes classifying the testing data in the inference classifier (234) in the classifier (230). The testing data is classified based on comparison between the testing feature vector and the time series sensor signal classification learning mode.

In a method similar to processing the training input data, for the testing input data, each of the testing input signals are transformed to $\hat{u}_{test}$, $\varepsilon_{test}$. Further the test feature vector $\mathcal{F}_{test}$ is generated as where input consists of $\hat{u}_{test}$, $\mathbb{E}_{test}$. The generated test features $\mathcal{F}_{test}$ are fed to the constructed adaptive filter based learning model to infer the class of the test instances.

According to an embodiment of the disclosure, the system for an adaptive filter based learning model for time series sensor signal classification on edge devices comprises the display module (236) for displaying the time series sensor signal classification on edge devices, as received from the inference classifier (234)

FIG. 7A and FIG. 7B, with reference to FIG. 1, is an exemplary flow diagram illustrating a method (700) for an adaptive filter based learning model for time series sensor signal classification on edge devices using the system 100 of FIG. 1 according to an embodiment of the present disclosure. The steps of the method of the present disclosure will now be explained with reference to the components of the system for an adaptive filter based learning model for time series sensor signal classification on edge devices and the modules (202-236) as depicted in FIG. 1, and the flow diagram as depicted in FIG. 7A and FIG. 7B.

At step 702, the method (700) includes receiving a plurality of training data that comprises of univariate time series data from a plurality of edge devices in the training data input module (204) of the input module (202). The plurality of time series input data includes atleast one of time series signals or time series classes.

In the next step at 704, the method (700) includes constructing a plurality of prediction filters in the training data prediction filter module (210) in the prediction filter module (208). The prediction filter is constructed based on adaptive filtering techniques that includes Finite Impulse Response Recursive Least Squares (FIR-RLS). The construction of the plurality of prediction filters is based on adaptive filtering techniques using the training data and a time delayed version of the training data to predict an optimal filter co-efficient. The time series signal prediction filter is constructed for each of the time series signals or a time series class prediction filter is constructed for each of the time series classes.

In the next step at 706, the method (700) constructing a linear filter using the predicted optimal filter co-efficient filter in the training data linear filter module (216) in the linear filter module (214). The linear filter is used to obtain a deterministic component and a stochastic component for each of the training data. In an embodiment, the time series input data in the linear filters (u(i)) is decomposed into deterministic component ($u_d(i)$) and the stochastic component ($u_s(i)$), whose transforms can be represented as $\hat{u}$ and $\varepsilon$.

In the next step at 708, the method (700) includes deriving a derivative spectrum from the deterministic component and the stochastic component in the derivative spectrum module (220). The derivative spectrum is derived based on fast fourier transform techniques to obtain a complete feature set of the training data. In an embodiment, the derivative spectrum of the $\hat{u}$ and the $\varepsilon$ that is derived is represented as $\hat{U}$ and $\mathbb{E}$, where a set of Fast Fourier Transform (FFT) co-efficients are computed based on deterministic component ($u_d(i)$) and the stochastic component ($u_s(i)$).

In the next step at 710, the method (700) includes selecting a subset of features from the complete feature set of the training data in the feature selection module (222). The subset of features is selected based on a set of pre-defined cut off frequencies. In an embodiment, the pre-defined cut off frequencies represented by a lower cut off frequency ($\Omega_l$) and a higher cut off frequency ($\Omega_h$) are determined using human-driven meta-information infusion.

In the next step at 712, the method (700) includes generating a training data feature vector from the selected sub-set of features from the training data in the feature vector module (224). In an embodiment, the feature vector is generated by derivative spectrum from each of the deterministic component and the stochastic component is determined using the pre-defined cut off frequencies is represented as $F = F_{\hat{U}}, F_{\mathbb{E}}$ In the next step at 714, the method (700) includes generating a time series sensor signal classification learning model in the training classifier (232) in the classifier (230). The time series sensor signal classification learning model is generated using the training data feature vector based on classification techniques for classification of time series signal on edge devices. In an embodiment, the classification techniques used in the learning model include Support Vector Machine (SVM) with radial basis function.

In one embodiment, the step of classification of time series signal on edge devices is explained an exemplary flow diagram in FIG. 6A and FIG. 6B as implemented by the system of FIG. 1 and includes the following steps;

At step 602, the method (600) includes receiving a plurality of testing data that comprises of univariate time series data from a plurality of edge devices in the testing data input module (206) of the input module (202). The plurality of time series input data includes atleast one of time series signals or time series classes.

In the next step at 604, the method (600) includes constructing a plurality of prediction filters in the testing data prediction filter module (212) in the prediction filter module (208). The prediction filter is constructed based on adaptive filtering techniques that includes Finite Impulse Response Recursive Least Squares (FIR-RLS). The construction of the plurality of prediction filters is based on adaptive filtering techniques using the testing data and a time delayed version of the testing data to predict an optimal filter co-efficient, wherein a time series signal prediction filter is constructed for each of the time series signals or a time series class prediction filter is constructed for each of the time series classes.

In the next step at 606, the method (600) includes constructing a linear filter using the predicted optimal filter co-efficient in the testing data linear filter module (218) in the linear filter module (214). The linear filter is used to obtain a deterministic component and a stochastic component for each of the testing data. In an embodiment, the time series input data in the linear filters (u(i)) is decomposed into deterministic component ($u_d(i)$) and the stochastic component ($u_s(i)$), whose transforms can be represented as $\hat{u}$ and $\varepsilon$.

In the next step at 608, the method (600) includes deriving a derivative spectrum from the deterministic component and the stochastic component in the derivative spectrum module (220). The derivative spectrum is derived based on fast fourier transform techniques to obtain a complete feature set of the testing data. In an embodiment, the derivative spectrum of the $\hat{u}$ and the $\varepsilon$ that is derived is represented as $\hat{U}$ and $\mathbb{E}$, where a set of Fast Fourier Transform (FFT) co-efficients are computed based on deterministic component ($u_d(i)$) and the stochastic component ($u_s(i)$).

In the next step at 610, the method (600) includes selecting a subset of features from the complete feature set of the testing data in the feature selection module (222). The subset of features is selected based on a set of pre-defined cut off frequencies. In an embodiment, the pre-defined cut off frequencies represented by a lower cut off frequency ($\Omega_l$) and a higher cut off frequency ($\Omega_h$) are determined using human-driven meta-information infusion.

In the next step at 612, the method (600) includes generating a testing feature vector from the selected sub-set of features of the testing data in the feature vector module (228). In an embodiment, the feature vector is generated by derivative spectrum from each of the deterministic component and the stochastic component is determined using the pre-defined cut off frequencies is represented as $F = F_{\hat{U}}, F_{\mathbb{E}}$ In the next step at 614, the method (600) includes classifying the testing data in the inference classifier (234) in the classifier (230). The testing data is classified based on comparison between the testing feature vector and the time series sensor signal classification learning mode.

In a method similar to processing the training input data, for the testing input data, each of the testing input signals are transformed to $\hat{u}_{test}$, $\varepsilon_{test}$. Further the test feature vector $\mathcal{F}_{test}$ is generated as where input consists of $\hat{u}_{test}$, $\mathbb{E}_{test}$. The generated test features $\mathcal{F}_{test}$ are fed to the constructed adaptive filter based learning model to infer the class of the test instances.

The classified time series sensor signal is displayed as received from the inference classifier (234) on the display module.

Experimental Results: An experiment has been internally conducted using five dataset that include FordA, FordB, wafer, Earthquake and ECGFiveDays, wherein the said dataset represents different application scenarios for practical time series analysis. In an embodiment, for an example, FordA and FordB try to identify faulty automobile engines analyzing the engine noise; wafer dataset represents semiconductor process control measurements of normal and abnormal fabrication; Earthquake dataset consists of vibration signals correspond to earthquake events; ECGFiveDays is a set of Electrocardiogram (ECG) signals of cardiac activity problem. The adaptive filter based learning model (100) has been utilized for time series sensor signal classification of the said datasets along with the state-of-the-art methods that include the state-of-the-art methods TimeNet for Time Series Classification (TN-C), SPGF based TimeNet (SPGF-TN-C) and Time series classification with ensembles of elastic distance measures (DTW-1NN). The experimental results (performance in terms of accuracy (in %)) have been documented and shown in Table 1 below;

TABLE 1

Classification performance in terms of accuracy (in %)

| UCR dataset | TN-C | SPGF-TN-C | DTW-1NN | Adaptive filter based learning model |
| --- | --- | --- | --- | --- |
| FordB | 73.70 | 89.25 | 68.60 | 80.30 |
| FordA | 78.10 | 93.17 | 65.90 | 69.53 |
| wafer | 99.50 | 99.88 | 99.50 | 94.81 |
| Earthquake | 76.70 | 81.98 | 70.30 | 81.90 |
| ECGFiveDays | 92.60 | 94.89 | 79.70 | 75.78 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence a method and a system for an adaptive filter based learning model for time series sensor signal classification on edge devices is provided. The adaptive filter based learning model for time series sensor signal classification enables automated-computationally lightweight learning (significant reduction in computational resources) and inferring/classification in real-time or near-real-time on CPU/memory/battery life constrained edge devices. The disclosed techniques for time series sensor signal classification on edge devices characterizes the intrinsic signal processing properties of the input time series sensor signals using linear adaptive filtering and derivative spectrum to efficiently construct the adaptive filter based learning model based on standard classification algorithms for time series sensor signal classification.

It is to be understood that the scope of the protection is extended to such a program and in addition to a computer-readable means having a message there in; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor-implemented method (700) for an adaptive filter based learning model for time series sensor signal classification on edge devices, the method comprising:

receiving a plurality of training data that comprises of univariate time series data from a plurality of edge devices of Internet of things (IoT) applications including wearable and implantable for predictive healthcare, low-cost edge processors for machine diagnostics, wherein the plurality of time series input data includes at least one of time series signals or time series classes (702), and wherein the time series data analysis is performed by obtaining dataset pertinent to faulty automobile engines, wafer representing semiconductor process control measurements of normal and abnormal fabrications, Earthquake dataset consists of vibration signals correspond to earthquake events, and a set of Electrocardiogram (ECG) signals related to cardiac activity problem;

constructing a first plurality of prediction filters based on an adaptive filtering techniques using the training data and a time delayed version of the training data to predict an optimal filter co-efficient, wherein the prediction filter acts as a learner of a structure of the input data to predict the optimal filter co-efficient for each of the input data, wherein a first time series signal prediction filter is constructed for each instance of the time series signals or a first time series class prediction filter is constructed for each of the time series classes (704), wherein the time series input is represented as u(i) is a time series $[u_1, u_2, u_3, \ldots, u_T] \in \mathbb{R}^T$ is an ordered set of real values, and a response d(i) is a time-advanced version of u(i), advanced by δ samples, such that: d(i)=u(i+δ) with i≥0, wherein when $\mathbb{U}$ be the training dataset, consists of $\{u^1(i), l^1\}, \{u^2(i), l^2\}, \ldots, \{u^N(i), l^N\}$, where N is the number of training instances and $l^n$ is corresponding class labels, wherein binary classification, $l^n \in +1$, the filter coefficients, $\omega_n(k)$, for k=0,1,2, ..., p of $p^{th}$ order FIR filter are derived by the adaptive filter constructed based on Finite Impulse Response Recursive Least Squares (FIR-RLS) filter techniques, wherein for each of u(i), an adaptation to create the first plurality of prediction filters is constructed for each instance of time series input signal, which results in deriving the optimal filter coefficients ($W^n$) for each of the training instances, results in $W^n$, n=1,2, ... N filter coefficient sets are generated, N=number of input instances, where $W^n \in \mathbb{R}^p$, p is the filter order, from $u^1(i)$, we get $W^1$ filter coefficients is obtained and subsequently, from $u^2(i), \ldots, u^N(i)$, $W^2, \ldots, W^N$ are computed and complete coefficient matrix is: $W \in \mathbb{R}^{N \times p}$;

constructing a first linear filter using the predicted optimal filter co-efficient to obtain a first deterministic component and a first stochastic component for each of the training data with decomposition of the time series input data into orthogonal signals û and ε and thereby possessing potential to reveal distinct features and the deterministic component and the stochastic component ensures availability of a distinct feature set (706), wherein each of the u(i) is filtered by respective prediction filters constructed using a corresponding prediction filter coefficients as: $u(i) \xrightarrow{W_i(z)} \hat{u}(i)$, û and ε are the transformation from each of the input data by the prediction filter is used for determining ε(i)=u(i)−û(i), wherein u(i) decompose into two components as: u(i)=$u_d(i)+u_s(i)$, where, $u_d(i)$ denotes the deterministic or regular part of u(i), and $u_s(i)$ is the stochastic or random part of u(i), wherein û(i) represents the deterministic component ($u_d(i)$) and ε(i) is the stochastic component ($u_s(i)$);

deriving a first derivative spectrum from the first deterministic component and the first stochastic component based on fast Fourier transform techniques to obtain a complete feature set of the training data, wherein the first derivative spectrum accentuates small structural differences between nearly identical spectra and enhances spectral resolution (708), wherein spectral derivatives of {û, ε} are computed and the first derivative spectrum {$\tilde{u}$, $\mathbb{E}$} is derived and expressed as: {û, ε} $\xrightarrow{Derivative\ spectrum}$ {$\tilde{u}$, $\mathbb{E}$};

selecting a first subset of features from the complete feature set of the training data based on a first set of pre-defined cut off frequencies are represented by a lower cut off frequency ($\Omega_l$) and a higher cut off frequency ($\Omega_h$) determined using human-driven meta-information infusion, wherein the first set of pre-defined cut off frequencies provides impetus to a learning process through the human-driven meta-information infusion (710);

generating a training data feature vector from the selected sub-set of features from training data (712);

generating a time series sensor signal classification learning model using the training data feature vector based on classification techniques for classification of time series signal on Central Processing Unit (CPU) or memory or battery life constrained edge devices in real-time and the time series sensor signal classification learning model for the time series signal classification provides automated-computationally lightweight learning with reduction in computational resources (714), wherein for time series sensor signal classification on the edge devices characterizes intrinsic signal processing properties of input time series sensor signals using a linear adaptive filtering and the first derivative spectrum to efficiently construct the adaptive filter based learning model based on classification algorithms for the time series sensor signal classification, wherein the time series sensor signal classification on the edge devices comprises classifying a testing data using the time series sensor signal classification learning model based on comparison between a testing feature vector and the time series sensor signal classification learning model by an inference classifier; and displaying the time series sensor signal classification on the edge devices as received from the inference classifier,
wherein the method performs the time series data analysis on the dataset to identify the faulty automobile engines analyzing an engine noise, the semiconductor process control measurements of normal and abnormal fabrication, the vibration signals corresponding to the earthquake events, and the ECG signals related to the cardiac activity problem, with improved classification performance accuracy and reduced training time.

2. The method of claim 1, further comprising the step of classification of time series signal on edge devices as follows:
receiving a plurality of testing data that comprises of univariate time series data from the plurality of edge devices, wherein the plurality of time series input data includes at least one of time series signals or time series classes (602);
constructing a second plurality of prediction filters based on adaptive filtering techniques using the testing data and a time delayed version of the testing data to predict an optimal filter co-efficient, wherein a second time series signal prediction filter is constructed for each instance of the time series signals or a second time series class prediction filter is constructed for each instance of the time series classes (604);
constructing a second linear filter using the predicted optimal filter co-efficient to obtain a second deterministic component and a second stochastic component for each of the testing data (606);
deriving a second derivative spectrum from the second deterministic component and the second stochastic component based on fast Fourier transform techniques to obtain a complete feature set of the testing data (608);
selecting a second subset of features from the complete feature set of the testing data based on a second set of pre-defined cut off frequencies (610); and
generating the testing feature vector from the selected sub-set of features (612) of the testing data and fed the generated testing feature vector to the constructed adaptive filter based learning model to infer the class of test instances.

3. The method of claim 1, the classification techniques used in the learning model include Support Vector Machine (SVM) with radial basis function.

4. A system (100) for an adaptive filter based learning model for time series sensor signal classification on edge devices comprising:
an adaptive filter based learning model (102) for time series sensor signal classification on edge devices;
a memory (104) for storing instructions;
one or more communication interfaces (106);
one or more hardware processors (108) communicatively coupled to the memory using the one or more communication interfaces, wherein the one or more hardware processors are configured by the instructions to execute the one or more modules of the adaptive filter based learning model (102) for time series sensor signal classification on edge devices, the system comprising:
an input module (202) is configured for receiving input that further includes a training data input module (204) for receiving a plurality of training data from a plurality of edge devices of Internet of things (IOT) applications including wearable and implantable for predictive healthcare, low-cost edge processors for machine diagnostics and a test data input module (206) for receiving a plurality of testing data from the plurality of edge devices, wherein the training and the testing data includes at least one of time series signals or time series classes, and wherein the time series data analysis is performed by obtaining dataset pertinent to faulty automobile engines, wafer representing semiconductor process control measurements of normal and abnormal fabrications, Earthquake dataset consists of vibration signals correspond to earthquake events, and a set of Electrocardiogram (ECG) signals related to cardiac activity problem;
a prediction filter module (208) that further includes a training data prediction filter module (210) configured for constructing a first plurality of prediction filters based on an adaptive filtering technique using the training data and a time delayed version of the training data and a testing data prediction filter module (212) configured for constructing a second plurality of prediction filters based on adaptive filtering techniques using the testing data and a time delayed version of the testing data to predict an optimal filter co-efficient, wherein the prediction filter acts as a learner of a structure of the input input is represented as u(i) is a time series $[u_1, u_2, u_3, \ldots, u_T] \in \mathbb{R}^T$ is an ordered set of real values, and a response d(i) is a time-advanced version of u(i), advanced by δ samples, such that: $d(i)=u(i+\delta)$ with $i \geq 0$, wherein when $\mathbb{U}$ be the training dataset, consists of $\{u^1(i), 1^1\}, \{u^2(i), 1^2\}, \ldots, \{u^N(i), 1^N\}$, where N is the number of training instances and $1^n$ is corresponding class labels, wherein binary classification, $1^n \in +1$, the filter coefficients, $\omega_n(k)$, for $k=0,1,2,\ldots,p$ of $p^{th}$ order FIR filter are derived by the adaptive filter constructed based on Finite Impulse Response Recursive Least Squares (FIR-RLS) filter techniques, wherein for each of u(i), an adaptation to create the first plurality of prediction filters is constructed for each instance of time series input signal, which results in deriving the optimal filter coefficients ($W^n$) for each of the training instances, results in $W^n$, $n=1,2,\ldots N$ filter coefficient sets are generated, N=number of input instances, where $W^n \in \mathbb{R}^p$, p is the filter order, from $u^1(i)$, we get $W^1$ filter coefficients is obtained and subsequently, from $u^2(i), \ldots, u^N(i)$, $W^2, \ldots, W^N$ are computed and complete coefficient matrix is: $W \in \mathbb{R}^{N \times p}$;
a linear filter module (214) configured for constructing a linear filter further includes a training data linear filter module (216) for constructing a first linear filter using the predicted optimal filter co-efficient to obtain a deterministic component and a stochastic component for each of the training data with decomposition of the time series input data into orthogonal signals û and ε and thereby possessing potential to reveal distinct features and the deterministic component and the stochastic component ensures availability of a distinct feature set and a testing data +linear filter module (218) for constructing a second linear filter using the predicted optimal filter co-efficient for each of the testing data, wherein each of the u(i) is filtered by respective prediction filters constructed using a corresponding prediction filter coefficients as: $u(i) \xrightarrow{W_i(z)} $ û and ε are the transformation from each of the input data by the prediction filter is used for determining $\varepsilon(i)=u(i)-\hat{u}(i)$, wherein u(i) decompose into two components as: u(i)

= $u_d(i)+u_s(i)$, where, $u_d(i)$ denotes the deterministic or regular part of u(i), and $u_s(i)$ is the stochastic or random part of u(i), wherein û(i) represents the deterministic component ($u_d(i)$) and ε(i) is the stochastic component ($u_s(i)$));

a derivative spectrum module (220) configured for deriving a derivative sprectrum from the deterministic component and the stochastic component based on fast Fourier transform techniques to obtain a complete feature set of the training data and the testing data, wherein the derivative spectrum accentuates small structural differences between nearly identical spectra and enhances spectral resolution, wherein spectral derivatives of {û, ε} are computed and the derivative spectrum {$\hat{U}$, $\mathbb{E}$} is derived and expressed as:

$$\{\hat{u}, \varepsilon\} \xrightarrow{\text{Derivative spectrum}} \{\hat{U}, \mathbb{E}\};$$

a feature selection module (222) configured for selecting a subset of features from the complete feature set of the training data and the complete feature set of the testing data based on a set of pre-defined cut off frequencies are represented by a lower cut off frequency ($\Omega_l$) and a higher cut off frequency ($\Omega_h$) determined using human-driven meta- information infusion, wherein the set of pre-defined cut off frequencies provides impetus to a learning process through the human-driven meta-information infusion;

a feature vector module (224) further includes a training data feature vector module (226) configured for generating a training feature vector from the selected sub-set of features of the training data and a testing data feature vector module (228) configured for generating a testing feature vector from the selected sub-set of features of the testing data;

a classifier (230) further comprising:

a training classifier (232) configured for generating time series sensor signal classification learning model using the training data feature vector based on classification techniques for classification of time series signal on Central Processing Unit (CPU) or memory or battery life constrained edge devices in real-time and the time series sensor signal classification learning model for the time series signal classification provides automated-computationally lightweight learning with reduction in computational resources, wherein for time series sensor signal classification on the edge devices characterizes intrinsic signal processing properties of input time series sensor signals using a linear adaptive filtering and the derivative spectrum to efficiently construct the adaptive filter based learning model based on classification algorithms for the time series sensor signal classification; and an inference classifier (234) configured for classifying the testing data using the time series sensor signal classification learning model based on comparison between the testing feature vector and the time series sensor signal classification learning model; and a display module (236) for displaying the time series sensor signal classification on the edge devices, as received from the inference classifier, wherein the system performs the time series data analysis on the dataset to identify the faulty automobile engines analyzing an engine noise, the semiconductor process control measurements of normal and abnormal fabrication, the vibration signals corresponding to the earthquake events, and the ECG signals related to the cardiac activity problem, with improved classification performance accuracy and reduced training time.

5. The system of claim 4, wherein the feature vector module (224) is configured for generating the training feature vector and the testing feature vector by using the derivative spectrum from each of the deterministic component and the stochastic component, is determined using the set of pre-defined cut off frequencies.

6. The system of claim 4, the classifier (230) is generated based on classification techniques used in the learning model include Support Vector Machine (SVM) with radial basis function.

7. A non-transitory computer-readable medium having embodied thereon a computer readable program an adaptive filter based learning model for time series sensor signal classification on edge devices wherein the computer readable program, when executed by one or more hardware processors, cause:

receiving a plurality of training data that comprises of univariate time series data from a plurality of edge devices of Internet of things (IoT) applications including wearable and implantable for predictive healthcare, low-cost edge processors for machine diagnostics, wherein the plurality of time series input data includes at least one of time series signals or time series classes, and wherein the time series data analysis is performed by obtaining dataset pertinent to faulty automobile engines, wafer representing semiconductor process control measurements of normal and abnormal fabrications, Earthquake dataset consists of vibration signals correspond to earthquake events, and a set of Electrocardiogram (ECG) signals related to cardiac activity problem;

constructing a plurality of prediction filters based on an adaptive filtering techniques using the training data and a time delayed version of the training data to predict an optimal filter co-efficient, wherein the prediction filter acts as a learner of a structure of the input data to predict the optimal filter co-efficient for each of the input data, wherein a time series signal prediction filter is constructed for each instance of the time series signals or a time series class prediction filter is constructed for each of the time series classes, wherein the time series input is represented as u(i) is a time series $[u_1, u_2, u_3, \ldots, u_T] \in \mathbb{R}^T$ is an ordered set of real values, and a response d(i) is a time-advanced version of u(i), advanced by δ samples, such that: d(i)=u(i+δ) with i≥0, wherein when $\mathbb{U}$ be the training dataset, consists of $\{u^1(i), l^1\}, \{u^2(i), l^2\}, \ldots, \{u^N(i), l^N\}$, where N is the number of training instances and $l^n$ is corresponding class labels, wherein binary classification, $l^n \in +1$, the filter coefficients, $\omega_n(k)$, for k=0,1,2, ..., p of $p^{th}$ order FIR filter are derived by the adaptive filter constructed based on Finite Impulse Response Recursive Least Squares (FIR-RLS) filter techniques, wherein for each of u(i), an adaptation to create the first plurality of prediction filters is constructed for each instance of time series input signal, which results in deriving the optimal filter coefficients ($W^n$) for each of the training instances, results in $W^n$, n=1,2, ... N filter coefficient sets are generated, N=number of input instances, where $W^n \in \mathbb{R}^p$, p is the filter order, from $u^1(i)$, we get $W^1$ filter coefficients is obtained and subsequently, from $u^2(i), \ldots, u^N(i), W^2, \ldots, W^N$ are computed and complete coefficient matrix is: $W \in \mathbb{R}^{N \times p}$;

constructing a linear filter using the predicted optimal filter co-efficient to obtain a deterministic component and a stochastic component for each of the training data with decomposition of the time series input data into orthogonal signals û and ε and thereby possessing potential to reveal distinct features and the deterministic component and the stochastic component ensures availability of a distinct feature set, wherein each of the u(i) is filtered by respective prediction filters constructed using a corresponding prediction filter coefficients as: $u(i) \xrightarrow{W_i(z)} \hat{u}$ and ε are the transformation from each of the input data by the prediction filter is used for determining ε(i)=u(i)−û(i), wherein u(i) decompose into two components as: $u(i)=u_d(i)+u_s(i)$, where, $u_d(i)$ denotes the deterministic or regular part of u(i), and $u_s(i)$ is the stochastic or random part of u(i), wherein û(i) represents the deterministic component ($u_d(i)$) and ε(i) is the stochastic component ($u_s(i)$));

deriving a derivative sprectrum from the deterministic component and the stochastic component based on fast Fourier transform techniques to obtain a complete feature set of the training data, wherein the derivative spectrum accentuates small structural differences between nearly identical spectra and enhances spectral resolution, wherein spectral derivatives of {û, ε} are computed and the derivative spectrum {$\hat{\mathcal{U}}$, $\mathbb{E}$} is iderivativead expressed as: $\{\hat{u}, \varepsilon\} \xrightarrow{spectrum} \{\hat{\mathcal{U}}, \mathbb{E}\}$;

selecting a subset of features from the complete feature set of the training data based on a set of pre-defined cut off frequencies are represented by a lower cut off frequency ($\Omega_l$) and a higher cut off frequency (($\Omega_h$) determined using human-driven meta-information infusion, wherein the first set of pre-defined cut off frequencies provides impetus to a learning process through the human-driven meta-information infusion;

generating a training data feature vector from the selected sub-set of features from training data;

generating a time series sensor signal classification learning model using the training data feature vector based on classification techniques for classification of time series signal on Central Processing Unit (CPU) or memory or battery life constrained edge devices in real-time and the time series sensor signal classification learning model for the time series signal classification provides automated-computationally lightweight learning with reduction in computational resources, wherein for time series sensor signal classification on the edge devices characterizes intrinsic signal processing properties of input time series sensor signals using a linear adaptive filtering and the derivative spectrum to efficiently construct the adaptive filter based learning model based on classification algorithms for the time series sensor signal classification, wherein the time series sensor signal classification on the edge devices comprises classifying a testing data using the time series sensor signal classification learning model based on comparison between a testing feature vector and the time series sensor signal classification learning model by an inference classifier; and displaying the time series sensor signal classification on the edge devices as received from the inference classifier, wherein the computer readable program performs the time series data analysis on the dataset to identify the faulty automobile engines analyzing an engine noise, the semiconductor process control measurements of normal and abnormal fabrication, the vibration signals corresponding to the earthquake events, and the ECG signals related to the cardiac activity problem, with improved classification performance accuracy and reduced training time.

\* \* \* \* \*